E. H. Russell,
Soldering Spiral Bands.

No. 113,099. Patented Mar. 28, 1871.

WITNESSES: INVENTOR.

A. J. Cushing
Peter P. Hughes

Elijah H. Russell
per B. F. Thurston
atty

United States Patent Office.

ELIJAH H. RUSSELL, OF PROVIDENCE, RHODE ISLAND.

Letters Patent No. 113,099, dated March 28, 1871.

IMPROVEMENT IN SOLDERING SPIRAL BANDS.

The Schedule referred to in these Letters Patent and making part of the same.

*To whom it may concern:*

Be it known that I, ELIJAH H. RUSSELL, of the city and county of Providence and State of Rhode Island, have invented a new and useful Improvement in Metallic Elastics; and I do hereby declare that the following specification, taken in connection with the drawing making a part thereof, is a full, clear, and exact description of the same.

My improvement relates to a means whereby the two ends of a coiled-wire elastic can be arranged so that they can be joined permanently by means of solder, the article being nearly as flexible at the joint as at any other point.

In the drawing—

Heretofore elastics of this kind have had their ends furnished with a hook and eye, no means having been devised for uniting the ends permanently together.

Figure 1:
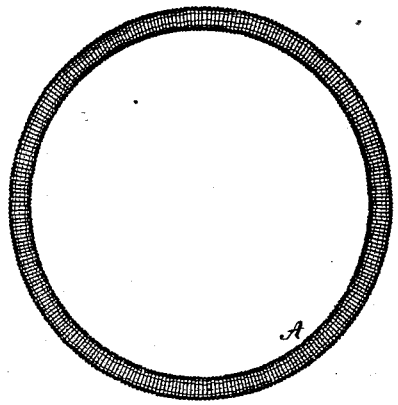
Figure 1 is a view in perspective of an elastic made of coiled wire.
Figure 2:
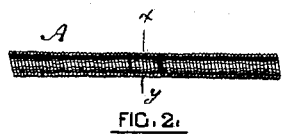
Figure 2 is a longitudinal section at the joint.

A, fig. 2, represents an elastic which is to be united at the line $x\ y$.

Figure 3:
Figure 3 is an elastic and flexible core-piece, used as the link of connection.

I make a helical coil precisely like that from which the elastic is made, with the difference that its diameter is the same as the interior diameter of the coil. I take a short section, B, fig. 3, of such last-named coil, and, as it is of the same size of wire as that from which the elastic is made, and has the same number of convolutions to the inch, it can be entered as a screw into the open ends of the elastic, and span the joint.

The convolutions of the inner coil or core B are next to be secured to the contiguous convolutions of the elastic proper by means of solder, and thus a flexible as well as elastic dowel or link of connection is made which, when soldered as stated, makes a permanent joint.

What I claim as my invention, and desire to secure by Letters Patent, is—

The employment, in combination with an elastic of the character described, of an interior core or threaded dowel, B, soldered to the elastic, as a means of securing the two ends of the elastic together, substantially as described.

ELIJAH H. RUSSELL.

Witnesses:
 PETER F. HUGHES,
 A. J. CUSHING.